US010931562B2

(12) United States Patent
Matsushita et al.

(10) Patent No.: US 10,931,562 B2
(45) Date of Patent: Feb. 23, 2021

(54) TRANSFER DEVICE, ADJUSTMENT DEVICE, AND PARAMETER ADJUSTING METHOD (71) Applicant: MITSUBISHI ELECTRIC CORPORATION, Tokyo (JP)

(72) Inventors: Ryuma Matsushita, Tokyo (JP); Yoshifumi Hotta, Tokyo (JP); Jun Mizuguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 54 days.

(21) Appl. No.: 16/087,432

(22) PCT Filed: May 16, 2016

(86) PCT No.: PCT/JP2016/064505
§ 371 (c)(1),
(2) Date: Sep. 21, 2018

(87) PCT Pub. No.: WO2017/199301
PCT Pub. Date: Nov. 23, 2017

(65) Prior Publication Data
US 2020/0127915 A1 Apr. 23, 2020

(51) Int. Cl.
H04L 12/733 (2013.01)
H04L 12/721 (2013.01)

(52) U.S. Cl.
CPC ............ H04L 45/126 (2013.01); H04L 45/70 (2013.01)

(58) Field of Classification Search
CPC ....... H04L 12/721; H04L 12/18; H04L 12/46; H04L 12/761; H04L 12/753; H04L 45/12;
(Continued)

(56) References Cited

U.S. PATENT DOCUMENTS 7,333,438 B1 * 2/2008 Rabie ................. H04L 41/0654
370/216
7,821,963 B2 * 10/2010 Guan ................... H04L 12/462
370/252

(Continued)

FOREIGN PATENT DOCUMENTS

CN 102804712 A 11/2012

OTHER PUBLICATIONS

E. W. Dijkstra, "A note on two problems in connexion with graphs", Numerische Mathematik, 1959, vol. 1, p. 269-271, total 3 pages.
(Continued)

Primary Examiner — Man U Phan
(74) Attorney, Agent, or Firm — Birch, Stewart, Kolasch & Birch, LLP (57) ABSTRACT A transfer device according to the present invention is a switching device that is one of transfer devices forming a network, and includes: a link state database that holds topology information of the network, and priority of the transfer device and priorities of other transfer devices forming the network to be used in path computation; a shortest path calculating unit that calculates a shortest path from a first switching device to a second switching device among the transfer devices forming the network on the basis of the topology information; and a priority adjusting unit that adjusts the priority of the transfer device on the basis of the shortest path calculated by the shortest path calculating unit and the priority of the transfer device and the priorities of the other transfer devices, wherein the priority adjusting unit adjusts the priority of the transfer device so that the number of overlaps with priority of another transfer device that is included with the transfer device in a shortest path from one start point to one destination and at the same distance from the start point as the transfer device is reduced.

9 Claims, 8 Drawing Sheets (58) Field of Classification Search
CPC ..... H04L 12/4641; H04L 45/16; H04L 45/48; H04L 12/56; H04L 12/26; H04L 12/28; H04L 1/00; H04J 1/16; H04J 3/14; H04J 3/26
USPC .................................. 370/220–255, 390–401
See application file for complete search history.

(56) References Cited

U.S. PATENT DOCUMENTS

| | | | |
|---|---|---|---|
| 8,199,640 B2 * | 6/2012 | Burckart | H04L 47/283 370/229 |
| 8,199,753 B2 * | 6/2012 | Mehta | H04L 12/4625 370/390 |
| 8,248,925 B2 | 8/2012 | Allan et al. | |
| 8,451,721 B2 * | 5/2013 | Burckart | H04L 47/10 370/229 |
| 8,594,088 B2 * | 11/2013 | Saltsidis | H04L 12/1836 370/236 |
| 8,670,310 B2 * | 3/2014 | Sharma | H04L 47/6215 370/230 |
| 8,675,522 B2 * | 3/2014 | Keesara | H04L 12/4633 370/254 |
| 8,693,315 B2 * | 4/2014 | Sathappan | H04L 12/4641 370/220 |
| 8,711,703 B2 * | 4/2014 | Allan | H04L 12/4625 370/238 |
| 8,750,820 B2 | 6/2014 | Allan et al. | |
| 9,106,556 B2 * | 8/2015 | Khera | H04L 45/12 |
| 9,264,341 B2 * | 2/2016 | Ma | H04L 45/00 |
| 9,374,295 B2 * | 6/2016 | Khera | H04L 45/12 |
| 9,455,900 B2 * | 9/2016 | Sathappan | H04L 12/18 |
| 9,497,104 B2 * | 11/2016 | Huang | H04L 45/02 |
| 10,015,079 B2 * | 7/2018 | Ji | H04L 45/125 |
| 10,484,405 B2 * | 11/2019 | Dasgupta | H04L 63/1425 |
| 10,484,406 B2 * | 11/2019 | Vasseur | H04L 63/1416 |
| 10,548,040 B2 * | 1/2020 | Astrom | H04B 17/318 |
| 10,558,591 B2 * | 2/2020 | Smith | G06F 13/4265 |
| 2011/0060844 A1 | 3/2011 | Allan et al. | |
| 2012/0307832 A1 | 12/2012 | Allen et al. | |
| 2014/0286334 A1 | 9/2014 | Allan et al. | |

OTHER PUBLICATIONS

IEEE P802.1aq/D4.6, "Media Access Control (MAC) Bridges and Virtual Bridged Local Area Networks—Amendment XX: Shortest Path Bridging", Draft Amendment to IEEE Std 802.1Q—2011, Feb. 10, 2012, total 363 pages.

Office Action dated Sep. 2, 2020 in corresponding Chinese Application No. 201680085260.0.

* cited by examiner

N: NODE IDENTIFIER
nr: IDENTIFIER OF ROOT NODE
nd: IDENTIFIER OF DESTINATION NODE
[ni]: IDENTIFIER OF NODE ON SHORTEST PATH FROM ROOT NODE TO DESTINATION NODE

FIG.7

FIG.8

TRANSFER DEVICE, ADJUSTMENT DEVICE, AND PARAMETER ADJUSTING METHOD

FIELD

The present invention relates to a transfer device that is one of transfer devices forming a network, an adjustment device, and a parameter adjusting method.

BACKGROUND

Shortest Path Bridging (SPB) is one of means for improving the reliability of a network (refer to Non Patent Literature 1). According to the SPB, each of transfer devices forming a network exchanges topology information of the network with other transfer devices, and all the transfer devices individually perform path computation. In this path computation, a plurality of shortest paths of equal distance (ECMP: equal cost multipath) are calculated, which enables redundant paths and load distribution. To effectively perform load distribution, more paths need to be obtained. By the path computation of the SPB, up to 16 shortest paths between two transfer devices can be obtained. The number of paths obtained by the SPB, however, depends on a parameter called bridge priority of each of the transfer devices included in the shortest paths.

CITATION LIST

Non Patent Literature

Non Patent Literature 1: IEEE P802.1aq/D4.6, 2012

SUMMARY

Technical Problem

In order to increase the number of paths calculated using the SPB, the bridge priorities of the transfer devices need to be adjusted. In the related art, however, the adjustment of the bridge priority of each transfer device has manually been performed, which is disadvantageous in lack of network operability and scalability.

The present invention has been made in view of the above, and an object thereof is to provide a transfer device capable of automatically adjusting bridge priority to be used in path computation.

Solution to Problem

To solve the aforementioned problems and achieve the object, the present invention provides a transfer device that is one of transfer devices forming a network. The transfer device includes: an information holding unit that holds topology information of the network, and priority of the transfer device and priorities of other transfer devices forming the network to be used in path computation; and a shortest path calculating unit that calculates a shortest path from a first transfer device to a second transfer device among the transfer devices forming the network on the basis of the topology information. The transfer device also includes a priority adjusting unit that adjusts the priority of the transfer device on the basis of the shortest path calculated by the shortest path calculating unit and the priority of the transfer device and the priorities of the other transfer devices, wherein the priority adjusting unit adjusts the priority of the transfer device so that the number of overlaps with priority of another transfer device that is included with the transfer device in a shortest path from one start point to one destination and at the same distance from the start point as the transfer device is reduced.

Advantageous Effects of Invention

A transfer device according to the present invention produces an effect of allowing automatic adjustment of bridge priority to be used in path computation.

DESCRIPTION OF EMBODIMENTS

A transfer device, an adjustment device, and a parameter adjusting method according to certain embodiments of the present invention will be described in detail below with reference to the drawings. Note that the present invention is not limited to the embodiments.

First Embodiment

Figure 1:
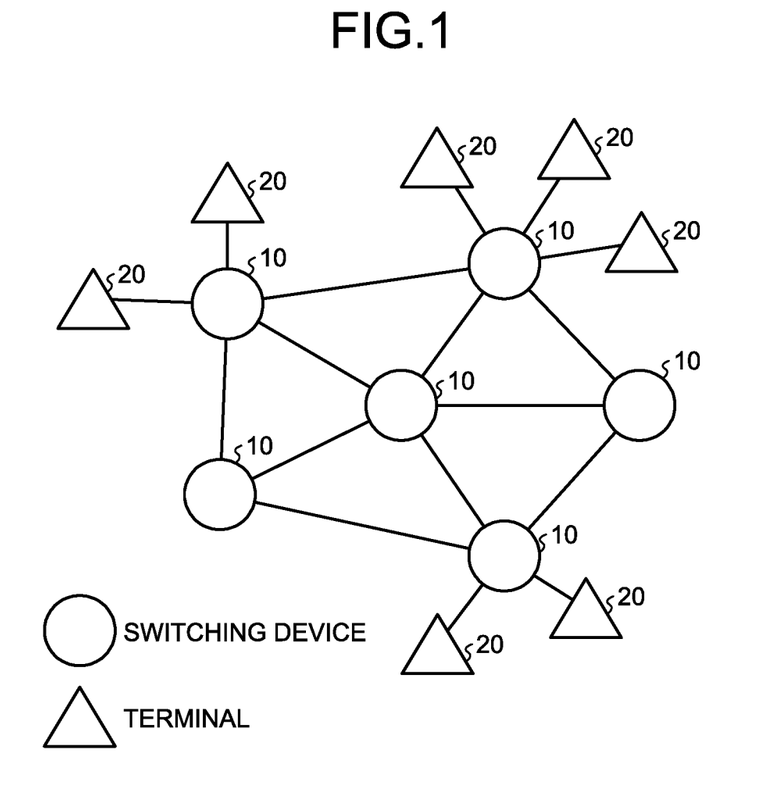
FIG. 1 is a diagram illustrating an example of a network formed by transfer devices according to a first embodiment.

FIG. 1 is a diagram illustrating an example of a network formed by transfer devices according to a first embodiment of the present invention. The network illustrated in FIG. 1 is formed by switching devices 10, which are transfer devices according to the first embodiment. Terminals 20 can be connected to each of the switching devices 10. Each of the switching devices 10 exchanges topology information of the network with the other switching devices 10 forming the network, and holds the topology information collected from the other switching devices 10. In addition, each of the switching devices 10 determines a path to each of the other switching devices 10, that is, a communication path for communication with each of the other switching devices 10 by the SPB. The terminals 20 communicate with other terminals 20 via the network formed by the switching devices 10. In FIG. 1, solid lines represent connections of the switching devices 10 and the terminals 20, and correspond to the communication paths. A communication path between two switching devices 10 is also called a link. Note that, in the description below, the switching devices 10 may be referred to as nodes.

Figure 2:
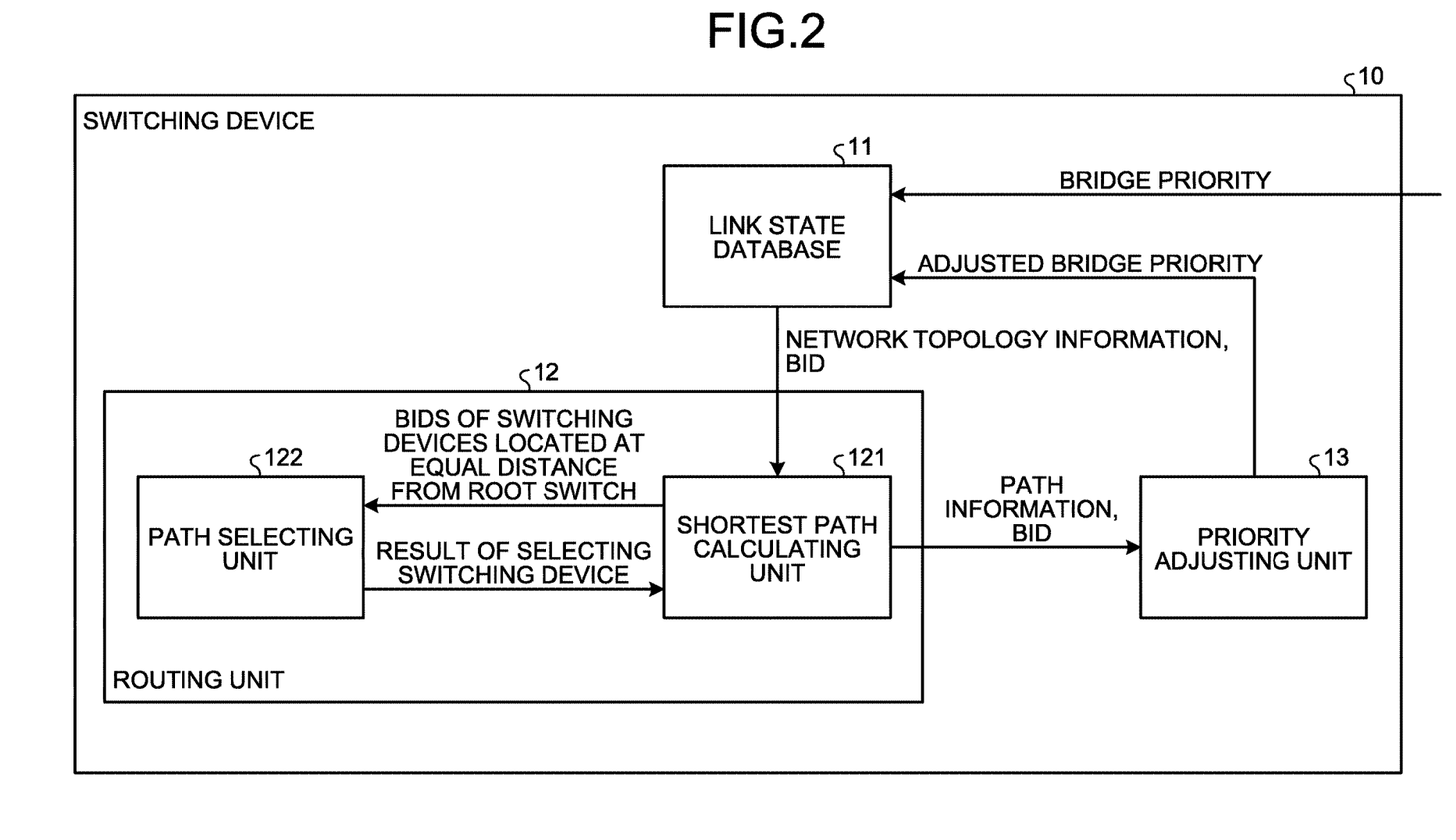
FIG. 2 is a diagram illustrating an example functional configuration of a transfer device according to the first embodiment.

FIG. 2 is a diagram illustrating an example functional configuration of a switching device according to the first embodiment. As illustrated in FIG. 2, the switching device 10 includes a link state database 11, a routing unit 12, and a priority adjusting unit 13. The routing unit 12 includes a shortest path calculating unit 121, and a path selecting unit 122. Note that FIG. 2 illustrates main components of the switching device 10, or more specifically, functional blocks necessary for setting communication paths for communication with the other switching devices 10, and omits illustration of the other functional blocks included in typical switching devices. Examples of the other functional blocks included in typical switching devices include functional blocks for the switching device 10 to perform communication with other communication devices, which are the other switching devices 10 or the terminals 20, that is, functional blocks for the switching device 10 to transmit and receive signals to and from other communication devices.

The link state database 11 holds topology information of the network formed by the switching devices 10 (hereinafter referred to as topology information), and bridge priority which is priority of each switching device 10. The link state database 11 is an information holding unit. The topology information includes information on connections between switching devices 10 and link costs. A link cost is information on the quality of each link between switching devices 10. A link cost is a bandwidth of each link, for example. Bridge priority is a parameter defined in Non Patent Literature 1. As described above, bridge priority is used for routing using the SPB. Thus, bridge priority is priority of each of switching device 10 used in path computation. An initial value of bridge priority is set in the link state database 11 externally by an administrator of the network or the like.

The routing unit 12 sets shortest paths for all combinations of the switching devices 10 forming the network on the basis of the topology information and the bridge priority held by the link state database 11. The routing unit 12 uses the SPB in routing. The SPB is performed by the operation of the shortest path calculating unit 121 and the path selecting unit 122.

The shortest path calculating unit 121 of the routing unit 12 calculates shortest paths from a first switching device, that is, a first transfer device, which is one of the switching devices 10 forming the network, to a second switching device, that is a second transfer device, which is one of the switching devices 10 other than the first switching device, on the basis of the topology information held by the link state database 11. The shortest path calculating unit 121 calculates shortest paths between all the pairs of switching devices 10 forming the network. For calculation of shortest paths from the first switching device to the second switching device, the shortest path calculating unit 121 uses the Dijkstra's algorithm described in a reference: "A note on two problems in connexion with graphs (Numerische Mathematik, 1959, Volume 1, pp. 269-271)."

In a case where a plurality of shortest paths from a switching device 10 that is a start point to a switching device 10 that is an end point are present, the path selecting unit 122 of the routing unit 12 selects one of the shortest paths by a tie-breaking algorithm. Specifically, in the case where a plurality of shortest paths connecting two switching devices 10 are present in a result of calculation from the shortest path calculating unit 121, the path selecting unit 122 selects one of the shortest paths and notifies the shortest path calculating unit 121 of the selection result. The tie-breaking algorithm selects one of the shortest paths from the switching device 10 that is the start point to the switching device 10 that is the end point on the basis of bridge identifications (IDs) of the switching devices 10 forming the network. A bridge ID is identification information of a switching device 10 obtained by combining the bridge priority and the media access control (MAC) address of the switching device 10. Since bridge priority has a length of 2 bytes, a bridge ID has a length of 8 bytes. In the description below, a bridge ID may be referred to as a BID.

Details of path selection procedures performed by the shortest path calculating unit 121 and the path selecting unit 122 of the routing unit 12, that is, path selection procedures with the combination of the Dijkstra's algorithm and the tie-breaking algorithm are described in Non Patent Literature 1.

The priority adjusting unit 13 adjusts the bridge priority, which is held by the link state database 11, of the switching device 10 in which the priority adjusting unit 13 is included on the basis of path information. The path information used for adjusting the bridge priority is information on shortest paths of all the combinations of the switching devices 10 forming the network. For example, in a case where the switching devices 10 forming the network are switching devices $10_1$ to $10_5$, the path information includes information on shortest paths between the switching device $10_1$ and the switching device $10_2$, shortest paths between the switching device $10_1$ and the switching device $10_3$, shortest paths between the switching device $10_1$ and the switching device $10_4$, shortest paths between the switching device $10_1$ and the switching device $10_5$, shortest paths between the switching device $10_2$ and the switching device $10_3$, shortest paths between the switching device $10_2$ and the switching device $10_4$, shortest paths between the switching device $10_2$ and the switching device $10_5$, shortest paths between the switching device $10_3$ and the switching device $10_4$, shortest paths between the switching device $10_3$ and the switching device $10_5$, and shortest paths between the switching device $10_4$ and the switching device $10_5$. Note that, according to the SPB, upper four bits of the bridge priority of 16 bits can be changed. Thus, the priority adjusting unit 13 performs adjustment on the upper four bits of the bridge priority. Details of operation for adjusting the bridge priority performed by the priority adjusting unit 13 will be described later.

Figure 3:
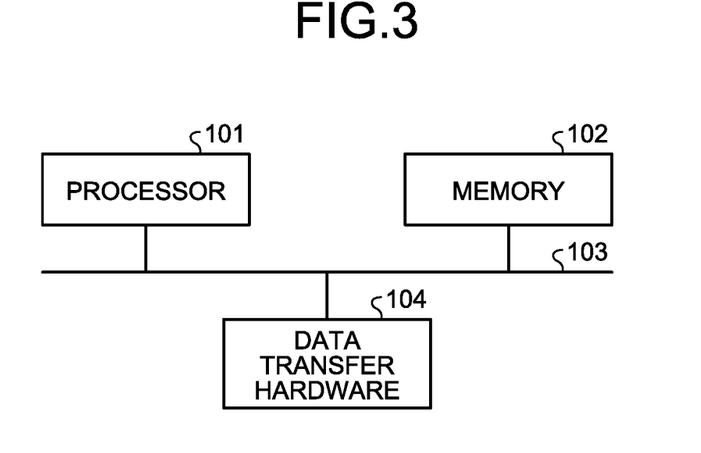
FIG. 3 is a diagram illustrating an example hardware configuration of the transfer device according to the first embodiment.

Hardware for implementing a switching device 10 will now be described. FIG. 3 is a diagram illustrating an example hardware configuration of a switching device according to the first embodiment. The switching device 10 can be implemented by a processor 101, a memory 102, and data transfer hardware 104 illustrated in FIG. 3. The processor 101, the memory 102, and the data transfer hardware 104 are connected via a bus 103.

The processor 101 is a central processing unit (CPU; also referred to as a central processor, a processing unit, a computing unit, a microprocessor, a microcomputer, a processor, or a digital signal processor (DSP)), a system large scale integration (LSI), or the like. The memory 102 is a nonvolatile or volatile semiconductor memory such as a random access memory (RAM), a read only memory (ROM), a flash memory, an erasable programmable read only memory (EPROM), or an electrically erasable programmable read only memory (EEPROM); a magnetic disk; a flexible disk; an optical disk; a compact disc; a mini disc; a digital versatile disc (DVD) or the like; for example.

The link state database 11 of the switching device 10 is implemented by the memory 102. The routing unit 12 and the priority adjusting unit 13 of the switching device 10 are implemented by software, firmware, or a combination of software and firmware. Software and firmware are described in the form of programs and stored in the memory 102. The routing unit 12 and the priority adjusting unit 13 are implemented by the processor 101 by reading programs for operating as the routing unit 12 and the priority adjusting unit 13 from the memory 102 and executing the read programs. Specifically, the switching device 10 includes the memory 102 for storing programs, which, when the functions of the switching device 10 are executed by the processor 101, results in execution of steps for performing the operation of the routing unit 12 and the priority adjusting unit 13. In other words, the programs cause a computer to execute the processes performed by the routing unit 12 and the priority adjusting unit 13.

The routing unit 12 and the priority adjusting unit 13 may be implemented by dedicated hardware. The dedicated hardware is a single circuit, a composite circuit, a programmed processor, a parallel-programmed processor, an application specific integrated circuit (ASIC), a field programmable gate array (FPGA), or a combination thereof. One of the routing unit 12 and the priority adjusting unit 13 may be implemented by dedicated hardware, and the other may be implemented by the processor 101 and the memory 102.

The data transfer hardware 104 is used when the switching device 10 receives data from another switching device 10 or a terminal 20 and when the switching device 10 transfers received data to another switching device 10 or a terminal 20. The data transfer hardware 104 is also used for reception of information to be stored in the link state database 11 from outside.

Next, operation of the priority adjusting unit 13 for adjusting bridge priority stored in the link state database 11 will be described.

Figure 4:
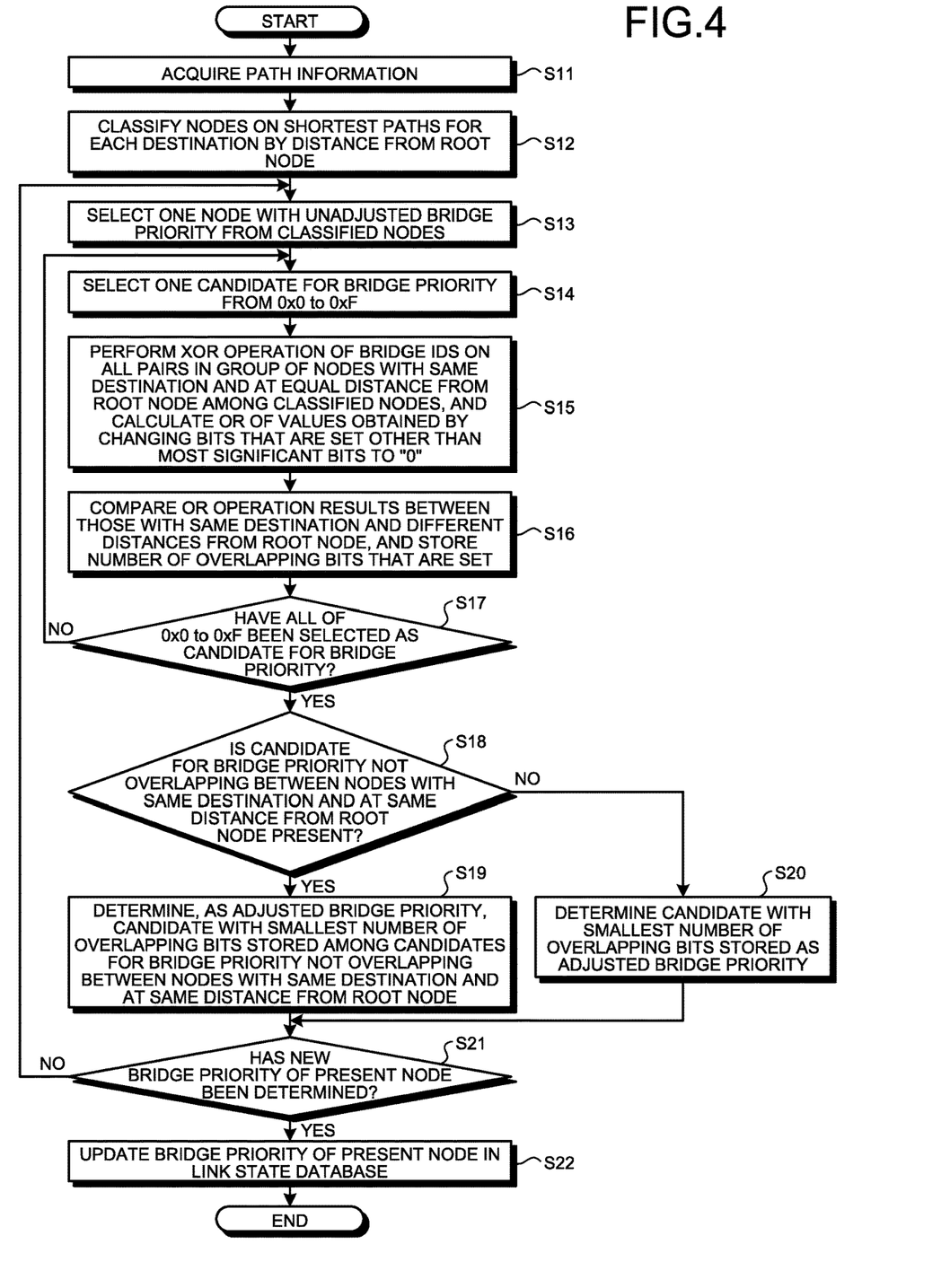
FIG. 4 is a flowchart illustrating an example of operation of a priority adjusting unit according to the first embodiment.

FIG. 4 is a flowchart illustrating an example of the operation of the priority adjusting unit 13 according to the first embodiment. Specifically, FIG. 4 is a flowchart illustrating an example of operation in a case where the priority adjusting unit 13 adjusts the bridge priority, which is stored in the link state database 11, of the switching device 10 in which the priority adjusting unit 13 is included.

Figure 5:
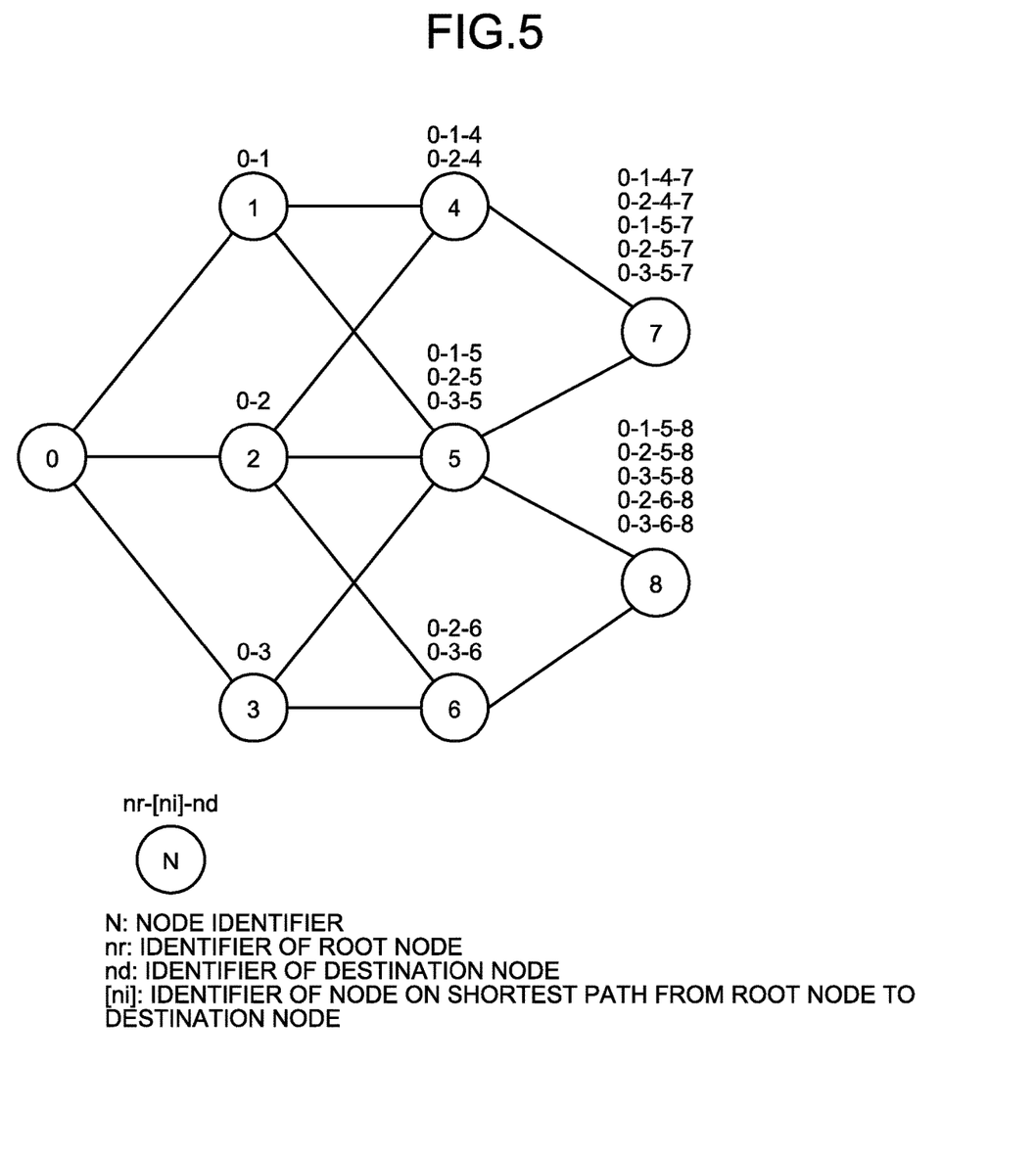
FIG. 5 is a diagram illustrating an example of the network formed by the transfer devices according to the first embodiment.

In the present embodiment, the operation will be described with reference to a case in which the switching devices 10 forms a network having a configuration illustrated in FIG. 5 as an example. In FIG. 5, circles (o) represent nodes, which are switching devices 10, and numbers in the circles are identifiers of the nodes. The numbers and hyphens described above each circle representing a node indicate shortest paths from a root node which is a node at a start point to another node. The left end numerical value of the shortest paths represents the identifier of the root node, and the right end numerical values of the shortest paths represent the identifiers of destination nodes, which are nodes at end points. The numerical values that correspond to neither of the left ends nor the right ends of the shortest paths represent identifiers of nodes located on the shortest paths. In the description below, a node with an identifier "N" (N=1, 2, 3, . . . ) will be referred to as a node N. In the example illustrated in FIG. 5, a node 0 is the root node. For example, two shortest paths from the node 0 to a node 4 are present. Specifically, a path represented by "0-1-4" from the node 0 to the node 4 via a node 1 and a path represented by "0-2-4" from the node 0 to the node 4 via a node 2 are present as the shortest paths from the node 0 to the node 4.

When a preset condition is met, such as when the topology information or the bridge priority held by the link state database 11 is changed or when an instruction from a network administrator from outside is received, the priority adjusting unit 13 performs the operation according to the flowchart illustrated in FIG. 4.

The priority adjusting unit 13 first acquires path information from the shortest path calculating unit 121 (step S11). The path information received by the priority adjusting unit 13 from the shortest path calculating unit 121 in step S11 is information on all the shortest paths between all combinations of two nodes in the network. The shortest path calculating unit 121 is assumed to complete calculation of the shortest paths, that is, calculation of all the shortest paths between all the combinations of two nodes in the network by the Dijkstra's algorithm. Alternatively, the shortest path calculating unit 121 may calculate the shortest paths upon request for path information from the priority adjusting unit 13 to generate the path information, and output the path information to the priority adjusting unit 13.

For example, in the case where the network formed by the switching devices 10 is the network illustrated in FIG. 5, the priority adjusting unit 13 acquires information on the shortest paths from each of the nodes 1 to 8 as a root node to each of the other nodes from the shortest path calculating unit 121 in step S11, in addition to the information on the shortest paths from the node 0 as the root node to each of the nodes 1 to 8. Thus, the priority adjusting unit 13 acquires information on the shortest paths from nodes nr to nodes nd (nr≠nd, and nr, nd=0, 1, 2, . . . , 8) from the shortest path calculating unit 121.

Subsequently, the priority adjusting unit 13 checks the path information acquired in step S11, and classifies the nodes on the shortest paths for each destination by the distance from the root node (step S12). In the case of the network illustrated in FIG. 5, the shortest paths from the node 0 to the node 4 are two paths, which are a path represented by "0-1-4" and a path represented by "0-2-4," for example. Thus, the priority adjusting unit 13 stores the node 1 and the node 2 as nodes that satisfy a condition of the root node=node 0, the destination node=node 4, and the distance from the root node=1. Similarly, in a case of the root node=node 0 and the destination node=node 7, the priority adjusting unit 13 stores the node 1, the node 2, and the node 3 as nodes that satisfy a condition of the distance from the root node=1, and stores the node 4 and the node 5 as nodes that satisfy a condition of the distance from the root node=2. Cases of the root node=node 0 and the destination node=node n (n=5, 6, 8) are similar to the above. The priority adjusting unit 13 performs similar processing to the processing performed in the case of the root node=node 0 on all the combinations of two nodes in the network. In the case of the network illustrated in FIG. 5, the priority adjusting unit 13 performs processing similar to the processing performed in the case of the root node=node 0 in the case where each of the nodes 1 to 8 is a root node. Thus, the priority adjusting unit 13 classifies the nodes constituting the shortest paths into groups of nodes at the same distance from the node nr for each of the pairs of the node nr and the node nd (nr≠nd, and nr, nd=0, 1, 2, . . . , 8).

Subsequently, the priority adjusting unit 13 selects one node with unadjusted bridge priority as a node to be adjusted from the nodes classified in step S12 above (step S13). The manner in which the node is selected may be selection in ascending order of the bridge IDs of the nodes, random selection, or the like, but is not limited thereto.

Subsequently, the priority adjusting unit 13 selects one candidate for bridge priority of the node to be adjusted selected in step S13 above from 0x0 to 0×F (step S14). Note that the candidate for the bridge priority to be selected is actually a candidate for the upper four bits, which are adjustable, of the bridge priority expressed in 16 bits. In the description below, to avoid complication of the description, the "candidate for the bridge priority" will be used as an expression meaning the "candidate for the upper four bits of the bridge priority." The manner in which the candidate for the bridge priority is selected may be selection in ascending order of 0x0 to 0×F, random selection from 0x0 to 0×F, or the like, but is not limited thereto. In subsequent steps S15 and S16, the priority adjusting unit 13 performs processing with the bridge priority of the node to be adjusted selected in step S13 being replaced with a value indicated by the candidate for the bridge priority selected in step S14. The processing in step S14 can be said to be a process of provisionally determining the bridge priority. The processing in steps S15 and S16 can be said to be a process of evaluating the provisionally determined bridge priority.

Subsequently, the priority adjusting unit 13 performs the processing as follows on each of the groups of nodes, each being a set of nodes constituting shortest paths from a root node (node nr) to a destination node (node nd) and being at the same distance from the root node, which are obtained by the classification in step S12 above. The priority adjusting unit 13 first performs an exclusive OR (XOR) operation of bridge IDs on all the pairs of nodes belonging to one of the node groups obtained in step S12 above. Furthermore, the priority adjusting unit 13 checks the result of the operation of each of the pairs in units of four upper bits. Specifically, the priority adjusting unit 13 checks each of the results of operation in units of four upper bits, and when finding four bits with a bit that is set, that is, when finding four bits indicating a value other than 0, extracts the found four bits, then changes the bits other than the most significant bit '1' of the extracted four bits to '0,' and performs an OR operation on the changed extraction results (step S15). The priority adjusting unit 13 may acquire the bridge ID of each node via the shortest path calculating unit 121 or directly from the link state database 11.

A specific example of the processing in step S15 will be described. In the case of the network illustrated in FIG. 5, the priority adjusting unit 13 stores {node 1, node 2, node 3} as a group of nodes satisfying the root node=node 0, the destination node=node 7, and the distance from the root node=1 in step S12 above. In this case, in step S15, the priority adjusting unit 13 first performs an XOR operation ((BID of node 1)^(BID of node 2)) of the bridge ID (BID) of the node 1 and the BID of the node 2 as an operation #1, performs an XOR operation ((BID of node 1)^(BID of node 3)) of the BID of the node 1 and the BID of the node 3 as an operation #2, and performs an XOR operation ((BID of node 2)^(BID of node 3)) of the BID of the node 2 and the BID of the node 3 as an operation #3. When it is assumed that the result of the operation #1 is 0x3000000000000000, the result of the operation #2 is 0x0000F00000000000, and the result of the operation #3 is 0x0000000000000007, the priority adjusting unit 13 subsequently extracts 0x3, that is, the four bits of '0011' from the result of the operation #1, extracts 0×F, that is, the four bits '1111' from the result of the operation #2, and extracts 0x7, that is, the four bits of '0111' from the result of the operation #3. The priority adjusting unit 13 subsequently changes '1' other than the most significant bit '1' to '0' of the four bits extracted from each of the operation results, and calculates OR of all the four bits resulting from the changes. Specifically, an OR operation of '0010', '1000', and '0100' is performed. In this case, an operation result of (0010|1000|0100)=1110 is obtained. The priority adjusting unit 13 performs the above processing on all of the groups of nodes obtained by the classification in step S12 above.

Subsequently, the priority adjusting unit 13 compares the results of operations in step S15 above between those with the same destination and different distances from the same root node, and stores the number of overlapping bits that are set (step S16). For example, in a case where the distance from a root node to a destination node is 4, the result of operation in the processing performed on the group of nodes at a distance of 1 from the root node, the result of operation in the processing performed on the group of nodes at a distance of 2 from the root node, and the result of operation in the processing performed on the group of nodes at a distance of 3 from the root node in step S15 above are compared, and the number of overlapping bits that are set is stored.

A specific example of the processing in step S16 will be described. A case where the node 0 is a root node (the root node=node 0) and the node 7 is a destination node (the destination node=node 7) in the network illustrated in FIG. 5 will be considered. In this case, the group of nodes satisfying the distance from the root node=1 is {node 1, node 2, node 3}, and the group of nodes satisfying the distance from the root node=2 is {node 4, node 5}. In a case where the result of the operation (operation result A) on {node 1, node 2, node 3} in step S15 above is '1110' and the result of operation (operation result B) on {node 4, node 5} in step S15 above is '0100', the second bits from the most significant bits are set (bit=1) in both of the operation results A and B, and the bits other than the second bits from the most significant bits are 0 in either one or both of the operation results A and B. Thus, the number of overlapping bits=1 is obtained. The priority adjusting unit 13 performs the above processing on each of the pairs of the node nr and the node nd (nr≠nd, and nr, nd=0, 1, 2, . . . , 8). The priority adjusting unit 13 then adds the numbers of overlapping bits calculated for the respective pairs of the node nr and the node nd, and stores the result of addition of the numbers of overlapping bits as the result of evaluation of the candidate for the bridge priority selected in step S14 above.

Subsequently, the priority adjusting unit 13 checks whether or not all of 0x0 to 0×F have been selected in step S14 above as candidates for the bridge priority of the node selected in step S13 above (step S17). Specifically, the priority adjusting unit 13 checks whether or not steps S15 and S16 above have been performed with the bridge priority of the node selected in step S13 above being set to all of the possible values. When all of 0x0 to 0×F have been selected in step S14 as candidates for the bridge priority of the node selected in step S13 above and the determination in step S17 is "Yes," a total of 16 numbers of overlapping bits, which are the respective results of operation in S16 for 0x0 to 0×F, are stored. In other words, when it is determined to be "Yes" in step S17, the priority adjusting unit 13 has stored therein the results of evaluation of the respective candidates for the bridge priority selected in step S13 above.

If any candidate that has not been selected in step S14 above is present among 0x0 to 0×F (step S17: No), the operation of the priority adjusting unit 13 returns to step S14 above, and the priority adjusting unit 13 selects one of the candidates for the bridge priority that have not been selected, that is, the candidates for the bridge priority on which the calculation of an evaluation result in steps S15 and S16 above has not been performed. The priority adjusting unit 13 then performs steps S15 and S16 above on the selected candidate for the bridge priority. If all of 0x0 to 0xF have been selected in step S14 above, that is, the calculation of an evaluation result in steps S15 and S16 above has been performed on all the candidates for the bridge priority (step S17: Yes), the priority adjusting unit 13 performs checking on the group of nodes to which the node to be adjusted, which is the node selected in step S13 above, belongs among the groups of nodes obtained by the classification in step S12 above, to check whether or not any candidate that does not overlap with the bridge priority of nodes with the same destination and at the distance from the same root node being equal to that of the node to be adjusted is present in the candidates 0x0 to 0xF of the bridge priority (step S18).

A specific example of the processing in step S18 will be described. A case where the node 0 is a root node (the root node=node 0) and the node 7 is a destination node (the destination node=node 7) in the network illustrated in FIG. 5 will be considered. In this case, the group of nodes satisfying the distance from the root node=2 is {node 4, node 5}. Assume that the node 5 is the node selected in step S13 above, and the bridge priority of the node 5 is to be adjusted. Thus, the node 5 is the node to be adjusted. In this case, bridge priority having the same value as the bridge priority of the node 4, which is not the node to be adjusted, is a candidate for the bridge priority overlapping between nodes with the same destination and at the same distance from the same root node. Bridge priority having a value different from that of the bridge priority of the node 4 is not a candidate for the bridge priority overlapping between nodes with the same destination and at the same distance from the same root node. Similar checking processes are performed on the other groups of nodes to which the node 5, which is the node to be adjusted, belongs, and if one or more bridge priorities that do not correspond to the "candidate for the bridge priority overlapping between nodes with the same destination and at the same distance from the same root node" are present in all the node groups to which the node 5 belongs, the determination result in step S18 above is "Yes." In other words, in step S18 above, the priority adjusting unit 13 checks the bridge priorities of the nodes other than the node to be adjusted in the node groups to which the node to be adjusted belongs, and determines as "Yes" if a bridge priority that is not set for any of the nodes other than the node to be adjusted is present.

If the determination result in step S18 is "Yes," the priority adjusting unit 13 determines, as adjusted bridge priority of the node to be adjusted (the node selected in step S13 above), the candidate with the smallest number of overlapping bits stored in step S16 above of the candidates for the bridge priority that do not overlap between nodes with the same destination and at the same distance from the same root node (step S19). For example, in a case where 0x2 to 0x7 are present as bridge priorities that are set in none of the nodes other than the node to be adjusted in the respective node groups to which the node to be adjusted belongs in step S18 above, the candidate with the smallest number of overlapping bits calculated in step S16 above among 0x2 to 0x7 is determined as the adjusted bridge priority of the node to be adjusted. In contrast, if the determination result in step S18 above is "No," the priority adjusting unit 13 determines, as the adjusted bridge priority of the node to be adjusted, a value corresponding to the candidate with the smallest number of overlapping bits calculated in step S16 above among all the candidates (0x0 to 0xF) for the bridge priority (step S20).

Subsequently, the priority adjusting unit 13 checks whether or not the adjusted bridge priority of the node in which the priority adjusting unit 13 is included has been determined (step S21), and the operation of the priority adjusting unit 13 returns to step S13 above if the adjusted bridge priority of the node has not been determined (step S21: No). If the adjusted bridge priority of the node has been determined (step S21: Yes), the priority adjusting unit 13 updates the bridge priority of the node in which the priority adjusting unit 13 is included in the link state database 11 with the bridge priority determined in step S19 or S20 above (step S22).

After updating the bridge priority of the switching device 10 in step S22, the switching device 10 notifies the other switching devices 10 of the updated bridge priority. In addition, in a case where the switching device 10 has received notification on updated bridge priority from another switching device 10, the switching device 10 overwrites the link state database 11 with the bridge priority on which notification is received to update the information, and performs the operation according to the flowchart illustrated in FIG. 4 using the updated bridge priority to adjust the bridge priority of the switching device 10.

As described above, in the switching device according to the present embodiment, the priority adjusting unit selects one of possible bridge priorities to be provisionally determined as adjusted bridge priority of the switching device, and performs the process of evaluating the provisionally determined bridge priority on all the possible bridge priorities. Specifically, the priority adjusting unit evaluates the provisionally determined bridge priority on the basis of the information on shortest paths from a first switching device to a second switching device included in the network and the bridge IDs of the switching device in which the priority adjusting unit is included and the other switching devices. The priority adjusting unit also determines adjusted bridge priority of the switching device in which the priority adjusting unit is included on the basis of the results of evaluation on the respective possible bridge priorities. In the calculation of a result of evaluation, the priority adjusting unit first performs an XOR operation of bridge IDs on all the pairs of switching devices belonging to the same group for each of the groups of switching devices with the same destination and at the same distance from the same start point, further extracts four bits satisfying a preset condition from the XOR operation results, changes bits '1' other than the most significant bits '1' to '0' of the four bits extracted from each of the operation results, and performs an OR operation on the changed four bits to generate a first operation result. Subsequently, the priority adjusting unit compares the first operation results of the groups of switching devices with the same destination and at different distances from the same start point to generate a second operation result as a result of evaluation of the provisionally determined bridge priority. Four bits satisfying the preset condition are upper four bits of an XOR operation result including the most significant bit that is '1.'

According to the switching device according to the present embodiment, bridge priority to be used in path computation by the SPB is automatically adjusted. Thus, the items to be manually set in the switching devices by an administrator of the network or the like are reduced, which improves the network operability and scalability.

Second Embodiment

In the first embodiment, each of switching devices forming a network determines an adjusted value of the bridge priority of the switching device itself. In contrast, in the present embodiment, one device collectively determines adjusted values of the bridge priorities of all the switching devices forming a network. Determination of the adjusted values of the bridge priorities may be determined by one representative switching device or by a device other than the switching devices. In the present embodiment, a case where a device other than the switching devices determines adjusted values of the bridge priorities of the switching devices will be described.

Figure 6:
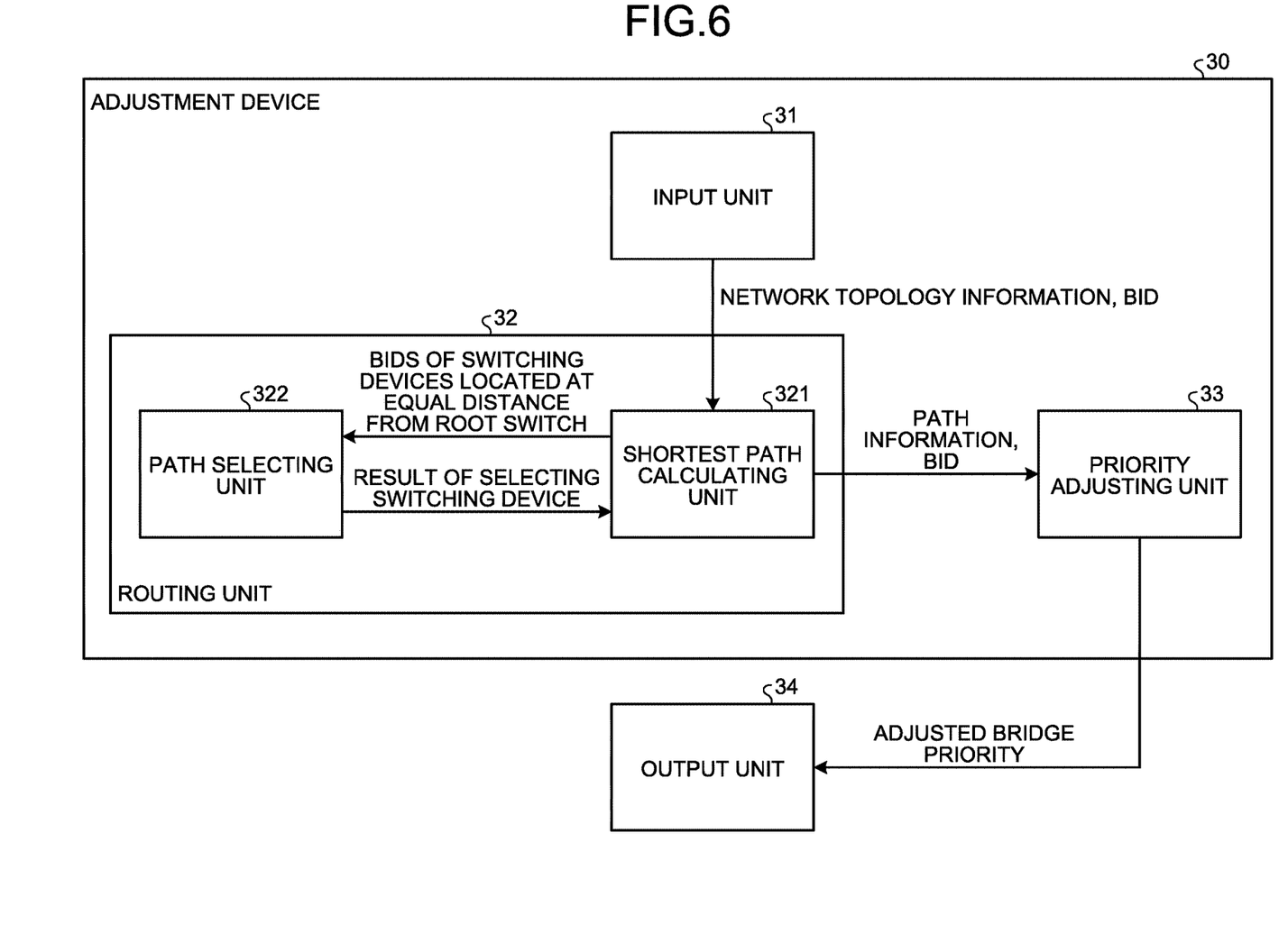
FIG. 6 is an example functional configuration of an adjustment device according to a second embodiment.

FIG. 6 is an example functional configuration of an adjustment device according to the second embodiment. An adjustment device 30 includes an input unit 31, a routing unit 32, a priority adjusting unit 33, and an output unit 34. The routing unit 32 includes a shortest path calculating unit 321 and a path selecting unit 322. The routing unit 32, the shortest path calculating unit 321, and the path selecting unit 322 of the adjustment device 30 are the same functional blocks as those of the routing unit 12, the shortest path calculating unit 121, and the path selecting unit 122 included in the switching device 10 of the first embodiment.

The priority adjusting unit 33 of the adjustment device 30 determines an adjusted value of the bridge priority of each of the switching devices forming the network by procedures similar to the procedures performed by the priority adjusting unit 13 of the first embodiment. While the priority adjusting unit 13 of the first embodiment terminates the process of determining an adjusted value when the adjusted value of the bridge priority of the switching device in which the priority adjusting unit 13 is included is determined, the priority adjusting unit 33 of the present embodiment continues the processing until the adjusted values of the bridge priorities of all the switching devices are determined.

The input unit 31 is an information acquiring unit for acquiring topology information of a network from outside and inputting the acquired topology information in the shortest path calculating unit 321.

The output unit 34 outputs the adjusted values of the bridge priorities of the respective switching devices determined by the priority adjusting unit 33 to the outside. The output unit 34 is implemented by a display device or a transmission device. In a case where the output unit 34 is implemented by a display device, the output unit 34 operates as a display unit for notifying an administrator of the network or the like of the adjusted values of the bridge priorities. In a case where the output unit 34 is implemented by a transmission device, the output unit 34 operates as a transmission unit for transmitting the adjusted values of the bridge priorities to the switching devices. The output unit 34 may be implemented by a display device and a transmission device, and operate as the display unit and the transmission unit.

Figure 7:
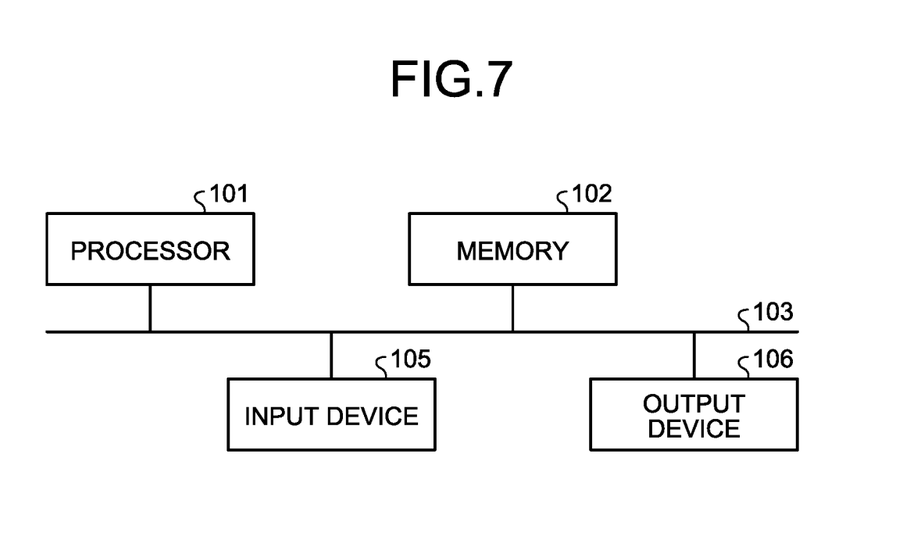
FIG. 7 is a diagram illustrating an example hardware configuration of the adjustment device according to the second embodiment.

FIG. 7 is a diagram illustrating an example hardware configuration of an adjustment device according to the second embodiment. The adjustment device 30 can be implemented by a processor 101, a memory 102, an input device 105 and an output device 106 illustrated in FIG. 7. The processor 101, the memory 102, the input device 105, and the output device 106 are connected via a bus 103. The processor 101 and the memory 102 are similar to the processor 101 and the memory 102, respectively, described in the first embodiment. The input device 105 may be a keyboard, a touch panel, a microphone, or the like, for example, but is not limited thereto. The output device 106 may be a display (also referred to as a monitor or a screen), a speaker, a transmission device, or the like, but is not limited thereto.

Figure 8:
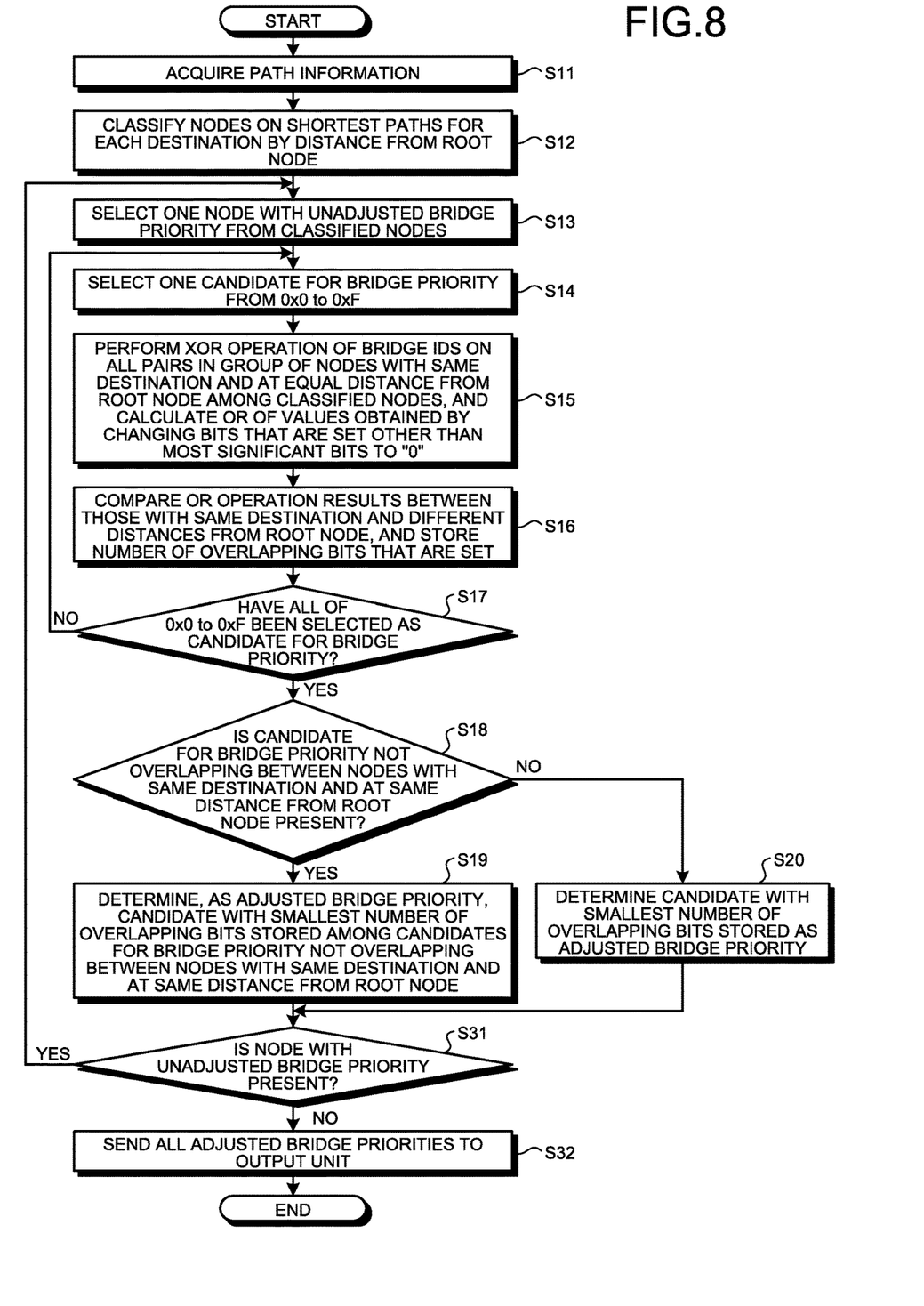
FIG. 8 is a flowchart illustrating an example of operation of a priority adjusting unit according to the second embodiment.

FIG. 8 is a flowchart illustrating an example of operation of the priority adjusting unit 33. The flowchart illustrated in FIG. 8 differs from the flowchart illustrated in FIG. 4 in that steps S21 and S22 are replaced with step S31 and S32. Since steps S11 to S20 illustrated in FIG. 8 are similar to steps S11 to S20 described in the first embodiment, the description thereof will not be repeated.

After performing step S19 or step S20, the priority adjusting unit 33 checks whether or not a node with unadjusted bridge priority is present, that is, whether or not adjusted values of the bridge priorities of all the nodes forming the network to be adjusted have been determined (step S31). If a node with unadjusted bridge priority is present (step S31: Yes), the operation of the priority adjusting unit 33 returns to step S13. If no node with unadjusted bridge priority is present (step S31: No), the priority adjusting unit 33 sends all the adjusted bridge priorities to the output unit 34 (step S32). In a case where the output unit 34 is a display or the like, the output unit 34 displays the adjusted bridge priorities upon receiving the adjusted bridge priorities from the priority adjusting unit 33.

While the adjustment device collectively determines the adjusted values of the bridge priorities of the respective switching devices, one of the switching devices forming the network may collectively determine the adjusted values of the bridge priorities of the respective switching devices as described above. In the case where one switching device collective determines the adjusted values of the bridge priorities of the respective switching devices, the switching device that determines the adjusted values notifies the other switching devices of the determined adjusted values of the bridge priorities of all the switching devices after determining the adjusted values.

As described above, in the present embodiment, one device collectively performs determination of the adjusted values of the bridge priorities of respective switching devices forming a network. As a result, all the switching devices need not perform similar processing, which reducing processing loads on the switching devices as a whole. In addition, the adjusted values of the bridge priorities of respective switching devices can be obtained at high speed. Furthermore, in the case where an adjustment device different from the switching devices determines the adjusted values of the bridge priorities of the respective switching devices, optimum values of the bridge priorities of the respective switching devices can be determined before establishing a network.

The configurations presented in the embodiments above are examples of the present invention, and can be combined with other known technologies or can be partly omitted or modified without departing from the scope of the present invention.

REFERENCE SIGNS LIST

10 switching device; 11 link state database; 12, routing unit; 13, 33 priority adjusting unit; 20 terminal; 30 adjustment device; 31 input unit; 34 output unit; 121, 321 shortest path calculating unit; 122, 322 path selecting unit.

The invention claimed is:

1. A transfer device that is one of transfer devices forming a network, the transfer device comprising:
    an information holding memory to hold topology information of the network, and priority of the transfer device and priorities of other transfer devices forming the network to be used in path computation;

a shortest path calculator to calculate a shortest path from a first transfer device to a second transfer device among the transfer devices forming the network on the basis of the topology information; and a priority adjuster to adjust the priority of the transfer device on the basis of the shortest path calculated by the shortest path calculator and the priority of the transfer device and the priorities of the other transfer devices, wherein the priority adjuster adjusts the priority of the transfer device so that the number of overlaps with priority of another transfer device that is included with the transfer device in a shortest path from one start point to one destination and at the same distance from the start point as the transfer device is reduced, wherein the priority adjuster performs a process of provisionally determining the priority of the transfer device to one of possible values and evaluating the provisionally determined priority on the basis of information on a shortest path between a first transfer device and a second transfer device, the first transfer device and the second transfer device being any two of the transfer devices forming the network, the priority of the transfer device, and the priorities of the other transfer devices, the priority adjuster performing the process on each of the possible values, and the priority adjuster determines the priority of the transfer device on the basis of results obtained by performing evaluation on each of the possible values provisionally determined as the priority.

2. The transfer device according to claim 1, wherein the priority adjuster performs, on each of groups of transfer devices with same destination and at same distance from one start point, a process of obtaining an exclusive OR of priorities of each of all pairs of transfer devices belonging to the group, further extracting four bits satisfying a preset condition from the results of the exclusive OR operations of the respective pairs, changing '1' of the extracted four bits other than most significant bits '1' to '0,' and performs an OR operation on the changed four bits to generate a first operation result, and then compares the first operation results between groups of transfer devices with same destination but at different distances from one start point to generate a second operation result as an evaluation result of the provisionally determined priority.

3. The transfer device according to claim 2, wherein in extracting the four bits satisfying the preset condition from the results of the exclusive OR operations, the priority adjuster checks a state of four upper bits of the results of the exclusive OR operations and extracts four bits including a bit set to '1' upon detecting the four bits including the bit set to '1,' and in comparing the first operation results between the groups of transfer devices with same destination but at different distances from one start point, the priority adjuster determines the number of overlaps of positions of bits set to '1' as the second operation result.

4. An adjustment device for adjusting a parameter set each of transfer devices forming a network, the adjustment device comprising:

an information acquiror to acquire topology information of the network, and priorities of the transfer devices, the priorities being the parameters used in path computation;

a shortest path calculator to calculate a shortest path from a first transfer device to a second transfer device among the transfer devices on the basis of the topology information; and a priority adjuster to adjust the priorities of the transfer devices on the basis of the shortest path calculated by the shortest path calculator and the priorities of the transfer devices, wherein the priority adjuster repeats a first process of selecting any one of the transfer devices as a transfer device to be adjusted, and a second process of adjusting priority of the transfer device to be adjusted so that the number of overlaps with priority of another transfer device included with the transfer device to be adjusted in a shortest path from one start point to one destination and located at same distance from the one start point as the transfer device to be adjusted is reduced, while changing a transfer device selected as the transfer device to be adjusted in the first process, wherein the priority adjuster performs a process of provisionally determining the priority of the transfer device to one of possible values and evaluating the provisionally determined priority on the basis of information on a shortest path between a first transfer device and a second transfer device, the first transfer device and the second transfer device being any two of the transfer devices forming the network, the priority of the transfer device, and the priorities of the other transfer devices, the priority adjuster performing the process on each of the possible values, and the priority adjuster determines the priority of the transfer device on the basis of results obtained by performing evaluation on each of the possible values provisionally determined as the priority.

5. The adjustment device according to claim 4, further comprising:

a display to display a result of adjustment obtained by the priority adjuster.

6. The adjustment device according to claim 4, further comprising:

a transmitter to transmit a result of adjustment obtained by the priority adjuster to the transfer devices.

7. A parameter adjusting method for a transfer device to adjust parameters, the transfer device being one of transfer devices forming a network, the parameter adjusting method comprising:

calculating a shortest path from a first transfer device to a second transfer device among the transfer devices forming the network on the basis of the topology information of the network; and adjusting priority of the transfer device on the basis of the shortest path calculated in the calculating a shortest path and priorities of the transfer devices forming the network, wherein in the adjusting priority, the priority of the transfer device is adjusted so that the number of overlaps with priority of another transfer device that is included with the transfer device in a shortest path from one start point to one destination and at same distance from the start point as the transfer device is reduced, and performing a process of provisionally determining the priority of the transfer device to one of possible values and evaluating the provisionally determined priority on the basis of information on a shortest path between a first transfer device and a second transfer device, the first transfer device and the second transfer device being any two of the transfer devices forming the network, the priority of the transfer device, and the priorities of the other transfer devices, performing the process on each of the possible values, and determining the priority of the transfer device on the basis of results obtained by performing evaluation on each of the possible values provisionally determined as the priority.

8. A parameter adjusting method for an adjustment device to adjust a parameter set each of transfer devices forming a network, the parameter adjusting method comprising:
  acquiring topology information of the network, and priorities of the transfer devices, the priorities being parameters used in path computation;
  calculating a shortest path from a first transfer device to a second transfer device among the transfer devices on the basis of the topology information; and
  adjusting the priorities of the transfer devices on the basis of the shortest path calculated in the calculating the shortest path and the priorities of the transfer devices, wherein
  the adjusting the priorities includes:
    selecting any one of the transfer devices as a transfer device to be adjusted; and
    adjusting priority of the transfer device to be adjusted so that the number of overlaps with priority of another transfer device included with the transfer device to be adjusted in a shortest path from one start point to one destination and located at same distance from the one start point as the transfer device to be adjusted is reduced, and
  the selecting and the adjusting priority of the transfer device to be adjusted are repeated while changing a transfer device selected as the transfer device to be adjusted in the selecting, and
  performing a process of provisionally determining the priority of the transfer device to one of possible values and evaluating the provisionally determined priority on the basis of information on a shortest path between a first transfer device and a second transfer device, the first transfer device and the second transfer device being any two of the transfer devices forming the network, the priority of the transfer device, and the priorities of the other transfer devices, performing the process on each of the possible values, and determining the priority of the transfer device on the basis of results obtained by performing evaluation on each of the possible values provisionally determined as the priority.

9. The adjustment device according to claim 5, further comprising:
  a transmitter to transmit a result of adjustment obtained by the priority adjuster to the transfer devices.

* * * * *